United States Patent
Lee et al.

(10) Patent No.: US 8,683,187 B2
(45) Date of Patent: Mar. 25, 2014

(54) METHOD AND APPARATUS FOR BOOTING HIBERNATION IN A PORTABLE TERMINAL

(75) Inventors: Ho-Sun Lee, Suwon-si (KR); Kyoung-Hoon Kim, Seoul (KR); Jong-Man Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 846 days.

(21) Appl. No.: 12/859,464

(22) Filed: Aug. 19, 2010

(65) Prior Publication Data
US 2011/0055541 A1 Mar. 3, 2011

(30) Foreign Application Priority Data
Aug. 27, 2009 (KR) .......................... 10-2009-0079575

(51) Int. Cl.
*G06F 15/177* (2006.01)
(52) U.S. Cl.
USPC .............................................. 713/2; 455/558

(58) Field of Classification Search
USPC ............................................ 455/558; 713/2
See application file for complete search history.

(56) References Cited

U.S. PATENT DOCUMENTS 8,068,433 B2 * 11/2011 Hodges et al. ................. 370/245
2010/0023788 A1 * 1/2010 Scott et al. ..................... 713/320

* cited by examiner

*Primary Examiner* — Albert Wang
(74) *Attorney, Agent, or Firm* — Jefferson IP Law, LLP

(57) ABSTRACT

A method and apparatus for hibernation booting in a mobile terminal supporting two processors are provided. In the hibernation booting method, when power is turned on, a master processor performs hibernation booting. A slave processor performs normal booting under control of the master processor. The master processor and the slave processor determine data needing synchronizing, and perform synchronization depending on whether the data needing synchronizing have been changed.

20 Claims, 7 Drawing Sheets

METHOD AND APPARATUS FOR BOOTING HIBERNATION IN A PORTABLE TERMINAL

PRIORITY

This application claims the benefit under 35 U.S.C. §119 (a) of a Korean patent application filed in the Korean Intellectual Property Office on Aug. 27, 2009 and assigned Serial No. 10-2009-0079575, the entire disclosure of which is hereby incorporated by reference.

BACKGROUND OF THE INVENTION

1. Field of the Invention

The present invention relates to a method and an apparatus for booting hibernation in a mobile terminal. More particularly, the present invention relates to a hibernation booting method and an apparatus thereof in a mobile terminal that supports both an Application Processor (AP) and a Baseband Processor (BP).

2. Description of the Related Art

FIG. 1 illustrates a normal booting procedure of a mobile terminal according to the conventional art.

Generally, a mobile terminal performs a booting procedure illustrated in FIG. 1 when power is turned on. Referring to FIG. 1, the mobile terminal executes a boot loader in step 101, performs a board initializing process of initializing a hardware device in step 103, and performs a kernel booting in step 105. The mobile terminal loads a file system to stack the same on Random Access Memory (RAM) in step 107, and loads an application to perform initialization in step 109.

Since the above-described booting procedure consumes a lot of time, when a user boots a terminal that performs functions similar to those of a Personal Computer (PC), for example, a Personal Digital Assistant (PDA) using the above method, the user has to wait and is thereby inconvenienced.

Accordingly, recently, a technique for remarkably reducing a booting time by omitting a RAM state setting process (for example, dynamic symbol resolution, global constructor execution, application specific initialization and setup, etc.) that consumes most of the time until the terminal becomes ready to be used by the user after a terminal such as the PDA performs booting, and performing a hibernation technique, is provided.

The hibernation technique immediately recovers a state where booting is completed by temporarily storing job information in a non-volatile memory when power is turned off at a computing system and then omitting an initial booting process and loading the temporarily stored job information when the power is turned on again.

FIG. 2 illustrates a hibernation procedure of a mobile terminal according to the conventional art.

As illustrated in FIG. 2, the mobile terminal executes a boot loader when power is turned on in step 201, performs board initialization in step 203, loads information stored in the non-volatile memory, that is, a snapshot image to stack the same in the RAM in step 205, and recovers the RAM state in step 207.

Recently, a smart phone that supports both a PDA function and a mobile phone function is provided. The smart phone includes an Application Processor (AP) for supporting the PDA function and a BP for supporting the mobile phone function. Therefore, the booting process of the smart phone is performed somewhat differently compared with the case of including only one processor. For example, generally, in the smart phone, an AP becomes a master to pass through an initial booting process of the AP, a Baseband Processor (BP) is booted to perform an independent booting process, and data that need to be shared between the AP and the BP are synchronized. Therefore, it is difficult to apply the conventional hibernation technique that considers only one processor in an apparatus such as the smart phone including two processors.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for booting hibernation in a mobile terminal.

Another aspect of the present invention is to provide a method and an apparatus for booting hibernation in a mobile terminal that supports both an Application Processor (AP) and a Baseband Processor (BP).

Still another aspect of the present invention is to provide a method and an apparatus for reducing a synchronization time between an AP and a BP in a mobile terminal that supports both the AP and the BP.

Yet another aspect of the present invention is to provide a method and an apparatus for storing and recovering, by an AP, a snapshot image of a BP in a mobile terminal that supports both the AP and the BP.

Yet still another aspect of the present invention is to provide a method and an apparatus for performing, by only an AP, hibernation booting, and performing, by a BP, normal booting in a mobile terminal that supports both the AP and the BP.

Yet further another aspect of the present invention is to provide a method and an apparatus for performing, by both an AP and a BP, hibernation booting in a mobile terminal that supports both the AP and the BP.

In accordance with an aspect of the present invention, a hibernation booting method in a mobile terminal that supports two processors is provided. The method includes when power is turned on, performing, by a master processor, hibernation booting, performing, by a slave processor, normal booting or hibernation booting under control of the master processor, and determining, by the master processor and the slave processor, data needing synchronizing, and performing synchronization depending on whether the data needing synchronizing have been changed.

In accordance with another aspect of the present invention, a hibernation booting apparatus in a mobile terminal that supports two processors is provided. The apparatus includes a master processor for performing hibernation booting when power is turned on, and a slave processor for performing normal booting or hibernation booting under control of the master processor, wherein the master processor and the slave processor determine data needing synchronizing and perform synchronization depending on whether the data needing synchronizing have been changed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a hibernation booting method and an apparatus thereof in a mobile terminal that supports both an Application Processor (AP) and a Baseband Processor (BP). Here, the mobile terminal denotes a terminal that supports both an application function for managing user data and data such as music and moving images, and a mobile phone function. In the following description, a terminal that supports a Personal Digital Assistant (PDA) function and a mobile phone function is exemplarily described. In addition, though an exemplary embodiment of the present invention is described using the case where the AP operates as a master, it is applicable to the case where the BP operates as a master.

Figure 3:
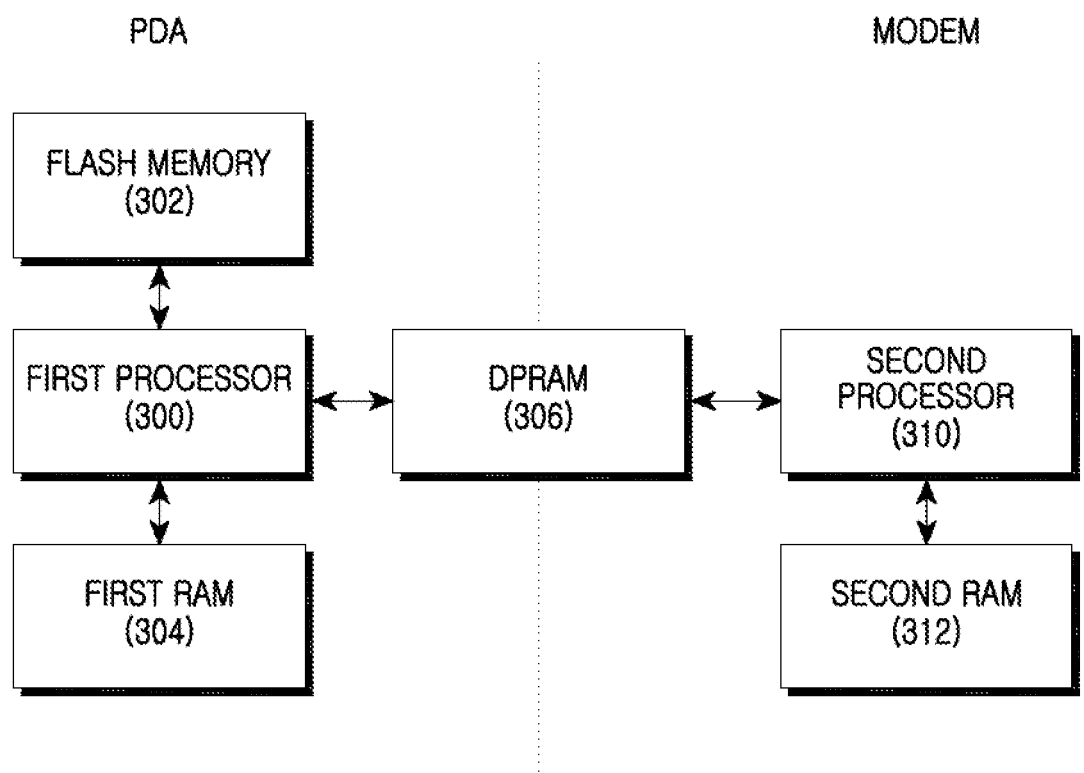
FIG. 3 is a block diagram illustrating a mobile terminal according to an exemplary embodiment of the present invention.

FIG. 3 is a block diagram illustrating a mobile terminal according to an exemplary embodiment of the present invention.

Referring to FIG. 3, the mobile terminal includes a first processor (for example, a Central Processing Unit (CPU)) 300, a second processor 310, a first Random Access Memory (RAM) 304, a second RAM 312, a flash memory 302, and a Dual Port RAM (DPRAM) 306. Here, a description is made using an example where the first processor 300 supports a PDA function, and the second processor 310 supports a mobile phone function. That is, the description is made on the assumption that the first processor serves as an AP, and the second processor 310 serves as a BP.

The first processor 300 controls and processes overall operations for the PDA function, controls a snapshot image representing job information to be temporarily stored in the flash memory 302 when power is turned off, and controls the snapshot image stored in the flash memory 302 to be stacked in the first RAM 304 or the second RAM 312 when the power is turned on. At this point, only the first processor 300 may perform the hibernation booting and the second processor 310 may perform the normal booting, or both the first and second processors 300 and 310 may perform the hibernation booting.

In the case where only the first processor 300 performs the hibernation booting, the first processor 300 executes a boot loader and initializes a board, loads a snapshot image of an application from the flash memory 302 to stack the snapshot image on the first RAM 304 and recover the state of the first RAM 304, outputs a power-on-signal so that the second processor 310 may perform a booting process, and controls and processes to perform synchronization with the second processor 310 that has performed the normal booting. At this point, the first processor 300 and the second processor 310 determines the minimum data that needs to be synchronized based on data stored in the first RAM 304 and data stored in the second RAM 312 to perform synchronization on only data having different values. This is because data subject to the second processor 310 exist among data stored in the first RAM 304 used by the first processor 300. For example, when a Subscriber Identification Module (SIM) card (not shown) has not been changed after the booting, Real Time Clock (RTC), Public Land Mobile Network (PLMN), Service Principal Name (SPN), a battery level, a Received Signal Strength Indicator (RSSI) level, a network state, and a system IDentifier (ID) are synchronized, and SIM card-related data (for example, phonebook data and message data) are not synchronized. In contrast, when the SIM card has been changed after the booting, RTC, PLMN, SPN, a battery level, an RSSI level, a network state, and a system ID are synchronized, and the SIM card-related data are also synchronized. Here, the second processor 310 may determine whether the SIM card has been changed. The second processor 310 may determine whether the SIM card has been changed through an Integrated Circuit Card IDentity (ICCID) of the SIM card.

In the case where both the first processor 300 and the second processor 310 perform the hibernation booting, the first processor 300 executes a boot loader and initializes a board, and loads a snapshot image of an application from the flash memory 302 to stack the snapshot image on the first RAM 304 and recover the state of the first RAM 304. After that, the first processor 300 outputs a power-on-signal so that the second processor 310 may perform the booting process, and loads a snapshot image of a baseband from the flash memory 302 to stack the same in the DPRAM 306. After that, the first processor 300 controls and processes to perform synchronization with the second processor 310 that has performed hibernation booting. At this point, the synchronization process is performed in the same way as only the first processor 300 performs the hibernation booting.

Figure 1:
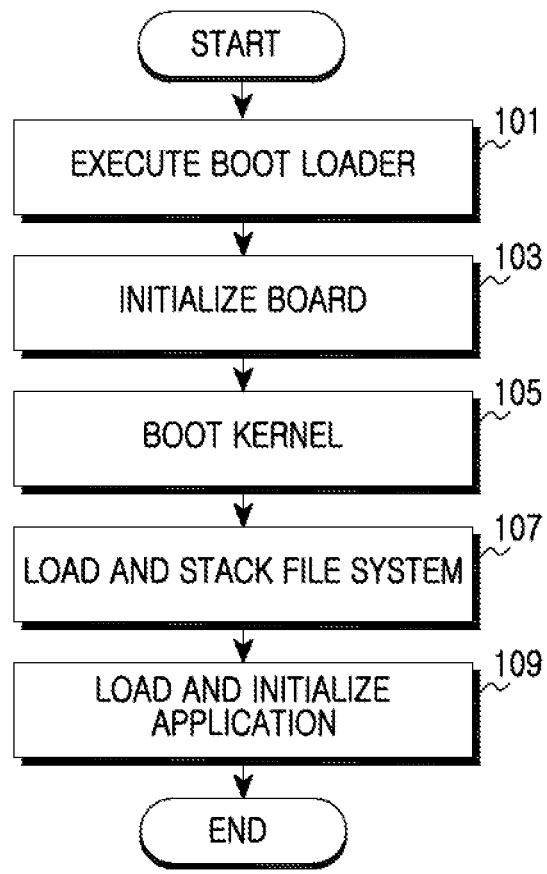
FIG. 1 is a flowchart illustrating a normal booting procedure of a mobile terminal according to the conventional art.
Figure 2:
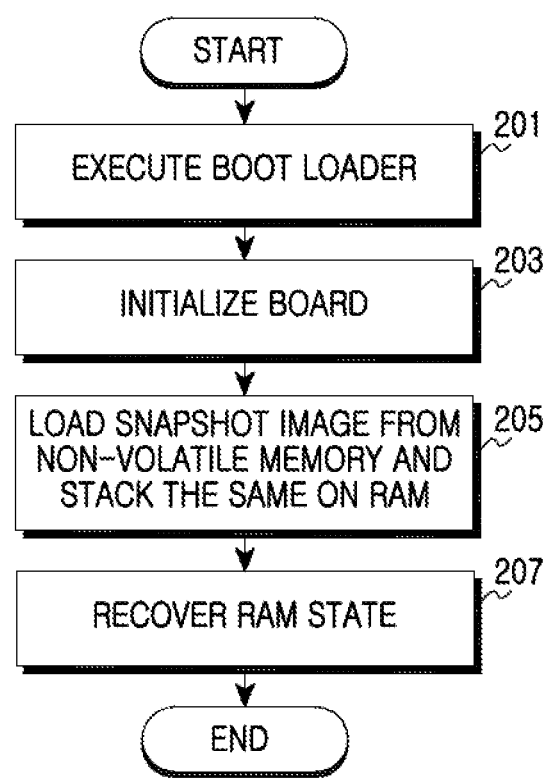
FIG. 2 is a flowchart illustrating a hibernation procedure of a mobile terminal according to the conventional art.

The second processor 310 controls and processes overall operations of the mobile phone function. When a power-on-signal is provided from the first processor 300, the second processor 310 performs the normal booting or the hibernation booting. During the normal booting, the second processor 310 performs booting according to a procedure shown in FIG. 1, determines whether data have been changed after the booting, and performs synchronization only when the data have been changed. This is because snapshot images of the first and second processors 300 and 310 have been generated at the same point, so that synchronization data included in the snapshot image are the same.

During the hibernation booting, the second processor 310 initializes a board, that is, a modem unit, loads the snapshot image of the baseband from the DPRAM 306 to stack the same on the second RAM 312, determines whether data have been changed after the booting, determines the minimum data to be synchronized with that of the first processor 300, and performs synchronization on only data having different values.

The first RAM 304 and the second RAM 312 are memories subject to the first processor 300 and the second processor 310, respectively, and stack corresponding snapshot images to immediately recover a booting-completed state.

The flash memory 302 is a non-volatile memory maintaining stored data even when power is turned off, and stores the snapshot image of the application or the snapshot image of the baseband.

The DPRAM 306 is accessible by both the first processor 300 and the second processor 310, and more particularly, is used for the first processor 300 to transfer the snapshot image of the baseband to the second processor 310 according to an exemplary embodiment of the present invention.

Figure 4:
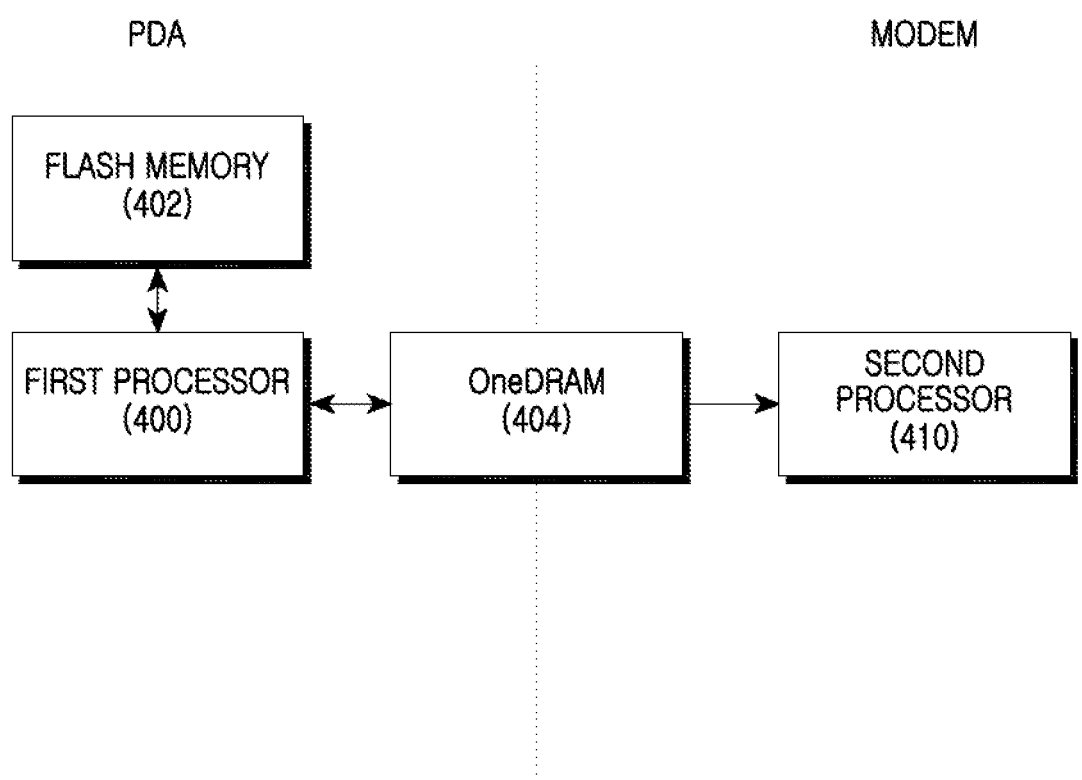
FIG. 4 is a block diagram illustrating a mobile terminal according to an exemplary embodiment of the present invention.

FIG. 4 is a block diagram illustrating a mobile terminal according to an exemplary embodiment of the present invention.

Referring to FIG. 4, the mobile terminal includes a first processor 400 (for example, a CPU), a second processor 410, a flash memory 402, and a OneDRAM 404. Here, a description is made using an example where the first processor 400 supports a PDA function, and the second processor 410 supports a mobile phone function. That is, the description is made on the assumption that the first processor 400 serves as an AP, and the second processor 410 serves as a BP.

The first processor 400 controls and processes overall operations for the PDA function, controls a snapshot image representing job information to be temporarily stored in the flash memory 402 when power is turned off, and controls the snapshot image stored in the flash memory 402 to be stacked in the OneDRAM 404 when the power is turned on. At this point, only the first processor 400 may perform the hibernation booting and the second processor 410 may perform the normal booting, or both the first and second processors 400 and 410 may perform the hibernation booting. Since overall operations of the first processor 400 is the same as that of the first processor 300 of FIG. 3, description thereof is omitted. The first processor 300 of FIG. 3 stacks a snapshot image of an application on the first RAM, and transfers a snapshot image of the baseband to the second processor 310 through the DPRAM 306, but the first processor 400 of FIG. 4 stacks snapshot images of the application and the baseband loaded from the flash memory 402 in the OneDRAM 404.

The second processor 410 controls and processes an overall function for the mobile phone function. Here, since overall operations of the second processor 410 are the same as that of the second processor 310 of FIG. 3, a description thereof is omitted. The second processor 310 of FIG. 3 loads a snapshot image of the baseband from the DPRAM 306 to stack the same on the second RAM 312, but the second processor 410 of FIG. 4 loads a snapshot image of the baseband from a shared region of the OneDRAM 404 to stack the same on a region of the OneDRAM 404, that is used by the second processor 410.

The OneDRAM 404 is obtained by merging two kinds of DRAMs having different functions, or merging SRAM and DRAM into one. The OneDRAM 404 is a shared memory of the first processor 400 and the second processor 410. The OneDRAM 404 includes one memory physically, but is divided into a memory region subject to the first processor 400 and the second processor 410, and a memory region shared by the two processors logically.

The flash memory 402 is a non-volatile memory maintaining stored data even when power is turned off, and stores a snapshot image of an application or a snapshot image of a baseband.

Figure 5:
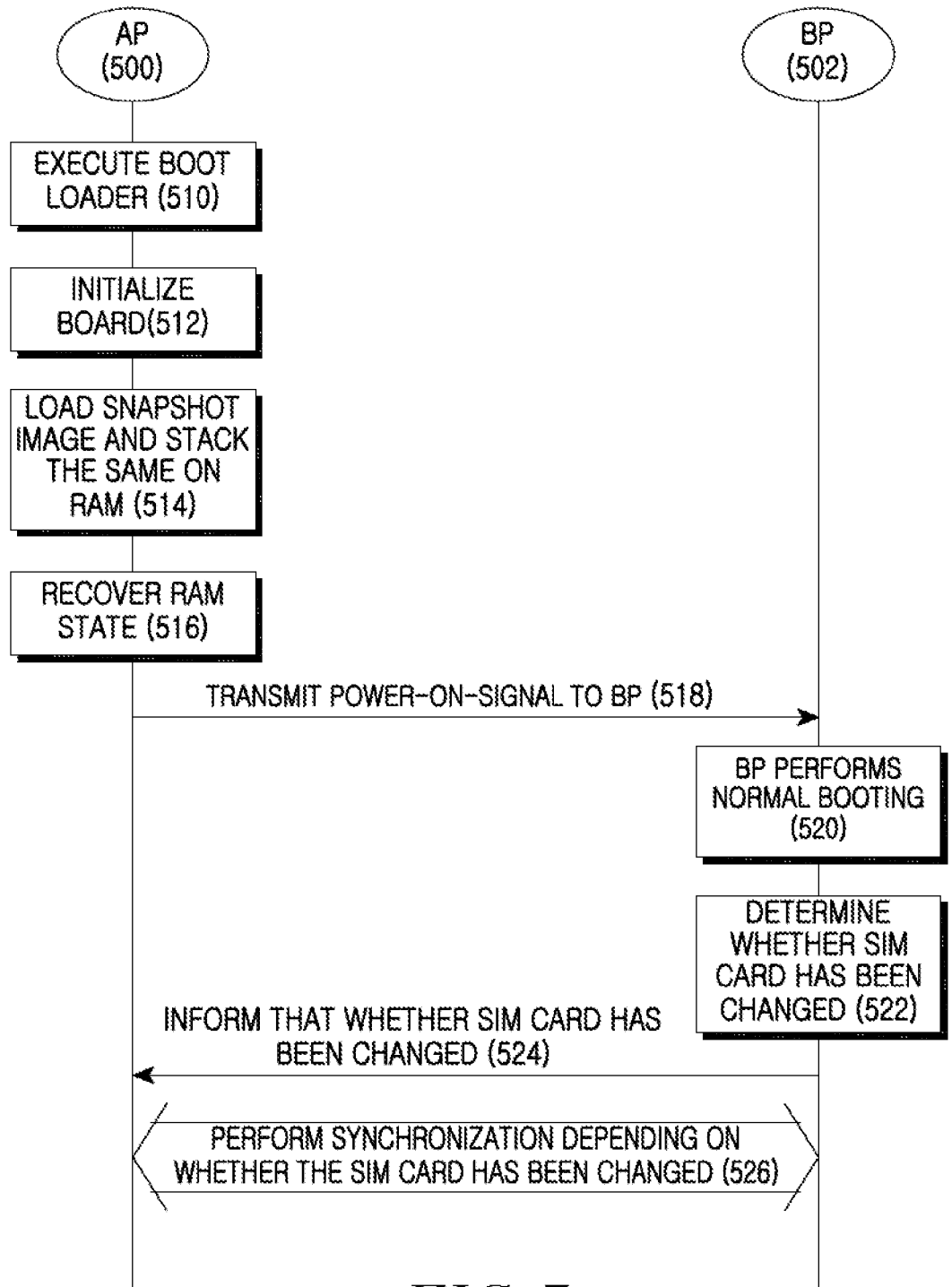
FIG. 5 is a diagram illustrating a hibernation performing procedure of a mobile terminal where an application processor and a baseband processor use an independent Random Access Memory (RAM) according to an exemplary embodiment of the present invention.

FIG. 5 is a diagram illustrating a hibernation performing procedure of a mobile terminal where an AP and a BP use independent RAMs, respectively, according to an exemplary embodiment of the present invention. That is, a case where an AP 500 performs hibernation booting and a BP 502 performs normal booting in the mobile terminal having the structure illustrated in FIG. 3 is described.

Referring to FIG. 5, when power is turned on, the AP 500 executes a boot loader in step 510, and initializes a board in step 512. The AP 500 loads a snapshot image of an application from the flash memory 302 to stack the same on the first RAM 304 used by the AP in step 514, and recovers a RAM state in step 516.

The AP 500 transmits a power-on-signal to the BP 502 in step 518.

The BP 502 that receives the power-on-signal performs normal booting in step 520, determines whether a SIM card has been changed after the booting in step 522, and informs the AP 500 that whether the SIM card has been changed in step 524. At this point, whether the SIM card has been changed is determined by comparing ICCIDs before and after the booting. Here, the ICCID before the booting is included in the snapshot image of the application and may be provided by the AP 500.

The AP 500 and the BP 502 perform a synchronization process depending on whether the SIM card has been changed in step 526. For example, when the SIM card has not been changed, RTC, PLMN, SPN, a battery level, a RSSI level, a network state, and a system ID are synchronized, and SIM card-related data is not synchronized. In contrast, when the SIM card has been changed, RTC, PLMN, SPN, a battery level, an RSSI level, a network state, and a system ID are synchronized, and the SIM card-related data is also synchronized. Here, the network state denotes one of a no service state (NoSVC), an urgent state, and a normal registration state of the terminal. The system ID denotes one ID of GSM, GPRS, EDGE, WCDMA, and HSDPA.

Figure 6:
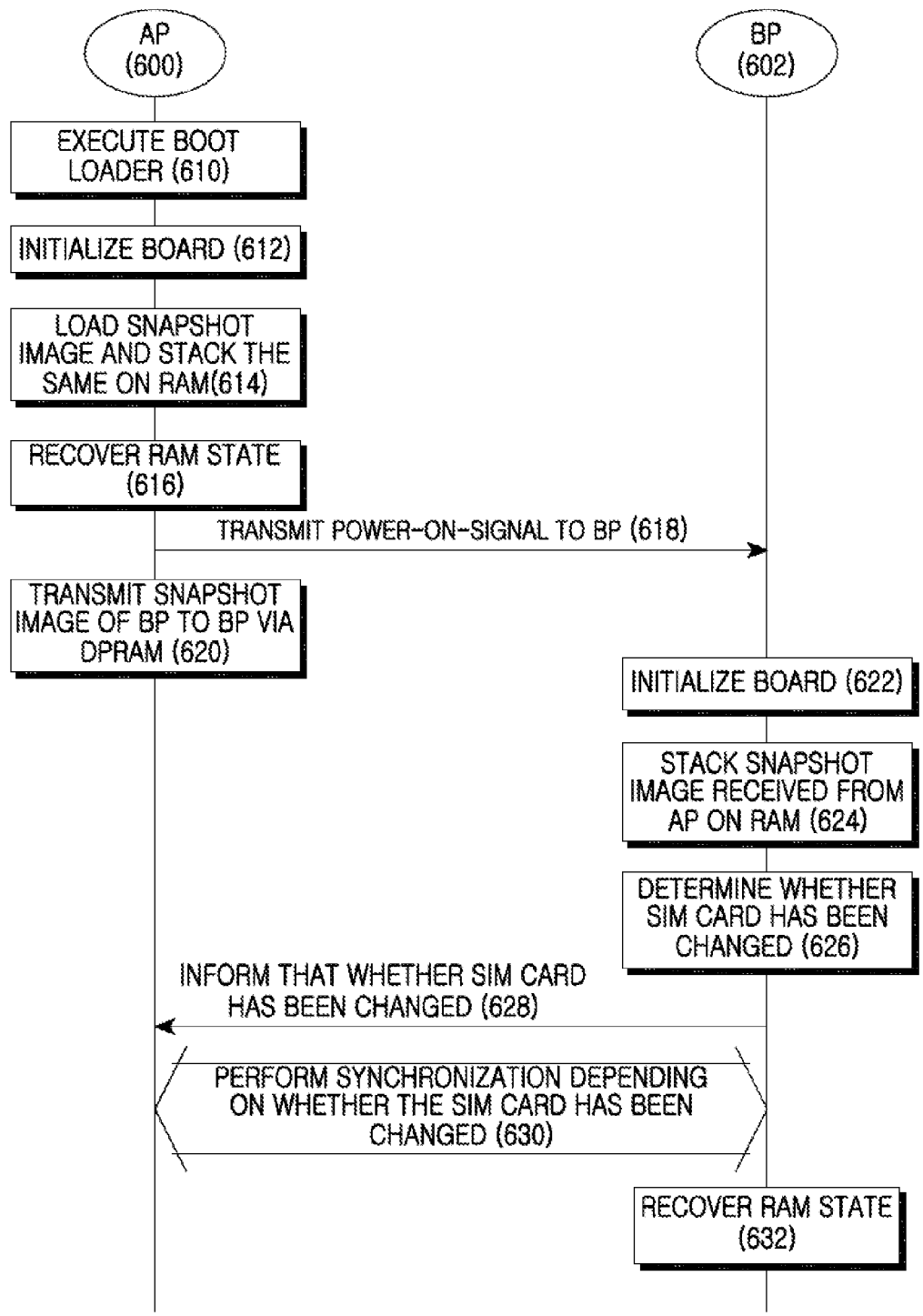
FIG. 6 is a diagram illustrating a hibernation performing procedure of a mobile terminal where an application processor and a baseband processor use an independent RAM according to an exemplary embodiment of the present invention.

FIG. 6 is a diagram illustrating a hibernation performing procedure of a mobile terminal where an AP and a BP use independent RAMs, respectively, according to an exemplary embodiment of the present invention. That is, a case where an AP 600 and a BP 602 perform hibernation booting in the mobile terminal having the structure illustrated in FIG. 3 is described.

Referring to FIG. 6, when power is turned on, the AP 600 executes a boot loader in step 610 and initializes a board in step 612. The AP 600 loads a snapshot image of an application from the flash memory 302 to stack the same in the first RAM 304 used by the AP 600 in step 614, and recovers a RAM state in step 616.

The AP 600 transmits a power-on-signal to the BP 602 in step 618, and loads a snapshot image of the baseband from the flash memory 302 to transmit the same to the BP 602 through the DPRAM 306 in step 620. That is, the AP 600 loads the snapshot image of the baseband to record the same on the DPRAM 306 accessible by the BP 602.

The BP 602 initializes a board in step 622 and stacks the snapshot image of the baseband received from the AP 600 via the DPRAM 306 on the second RAM 312 used by the BP in step 624. That is, the BP 602 loads the snapshot image of the baseband from the DPRAM 306 to stack the same on the second RAM 312. The BP 602 determines whether a SIM card has been changed after the booting in step 626, and informs the AP 600 that whether the SIM card has been changed in step 628. At this point, whether the SIM card has been changed is determined by comparing ICCIDs before and after the booting. Here, the ICCID before the booting is included in the snapshot image of the application and may be provided by the AP 600.

The AP 600 and the BP 602 perform a synchronization process depending on whether the SIM card has been changed in step 630. Here, the AP 600 and the BP 602 do not perform a separate synchronization process when the SIM card has not been changed, and perform the synchronization process on the SIM card-related data when the SIM card has been changed. This is because snapshot images of the AP 600 and the BP 602 have been generated at the same point, so that synchronization data included in the snapshot images are the same.

The BP 602 completes the booting process by recovering a state of the second RAM 312 in step 632.

Figure 7:
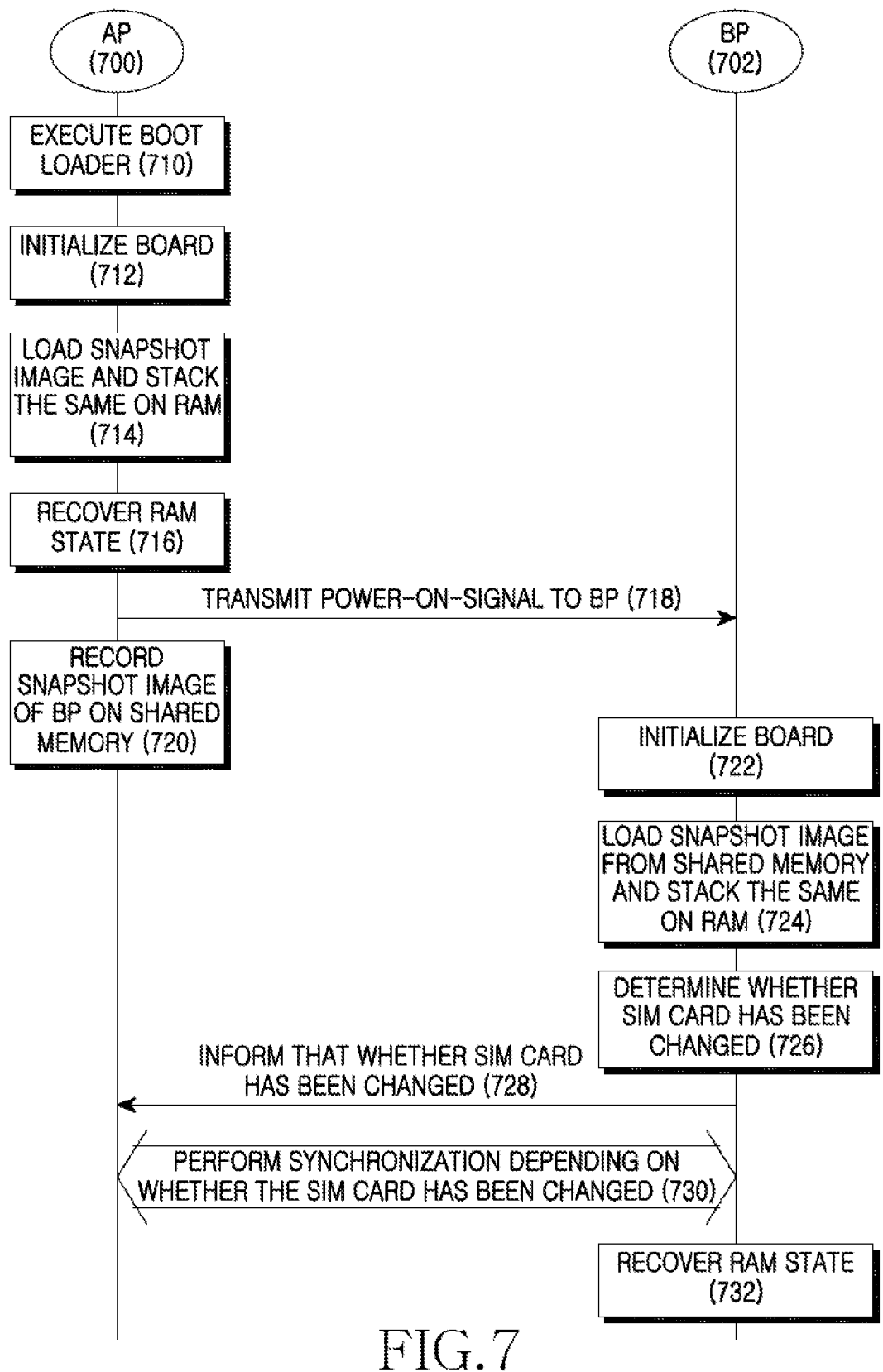
FIG. 7 is a diagram illustrating a hibernation performing procedure of a mobile terminal where an application processor and a baseband processor use a shared memory according to an exemplary embodiment of the present invention.

FIG. 7 is a diagram illustrating a hibernation performing procedure of a mobile terminal where an AP and a BP use a shared memory according to an exemplary embodiment of the present invention. That is, a case where an AP and a BP perform hibernation booting in the mobile terminal having the structure illustrated in FIG. 4 is described.

Referring to FIG. 7, when power is turned on, an AP 700 executes a boot loader in step 710 and initializes a board in step 712. The AP 700 loads a snapshot image of an application from the flash memory 402 to stack the loaded snapshot image in a memory region of the OneDRAM 404, which is used by the AP 700 in step 714. The OneDRAM 404 is shared by the AP 700 and the BP 702. The AP 700 recovers a state of the region of the OneDRAM, which is used by the AP 700 in step 716.

The AP 700 transmits a power-on-signal to the BP 702 in step 718 and loads a snapshot image of the baseband from the flash memory 402 to record the same in the shared memory in step 720. That is, the AP 700 records the snapshot image of the baseband in the memory region of the OneDRAM 404, which is shared by the AP 700 and the BP 702.

The BP 702 that receives the power-on-signal initializes a board in step 722 and loads a snapshot image of the baseband from the shared memory to stack the same on the memory region of the OneDRAM 404, which is used by the BP in step 724. The BP 702 determines whether a SIM card has been changed after the booting in step 726 and informs the AP 700 whether the SIM card has been changed in step 728. At this point, whether the SIM card has been changed is determined by comparing ICCIDs before and after the booting. Here, the ICCID before the booting is included in the snapshot image of the application and may be provided by the AP 700.

The AP 700 and the BP 702 perform a synchronization process depending on whether the SIM card has been changed in step 730. Here, the AP 700 and the BP 702 do not perform a separate synchronization process when the SIM card has not been changed, and perform the synchronization process on the SIM card-related data when the SIM card has been changed. This is because snapshot images of the AP 700 and the BP 702 have been generated at the same point, so that synchronization data included in the snapshot images are the same.

The BP 702 completes the booting process by recovering a state of the region of the OneDRAM 404, which is used by the BP 702 in step 732.

Here, since the AP 700 and the BP 702 share the memory, the AP 702 may directly stack the snapshot image of the baseband on the shared region of the memory. In this case, the AP 700 may play a leading role for recovering the RAM state.

Though both the AP and the BP perform hibernation booting in the case where the AP and the BP use the shared memory in the above description, only the AP may perform the hibernation booting and the BP may perform the normal booting in the case where the shard memory is used. At this point, operations of the AP and the BP are similar to those illustrated in FIG. 5 on the whole, and only a memory using method may be different.

In addition, though the BP determines whether the data for synchronization between the processors have been changed in the above description, the AP may receive related data from the BP to determine whether the data have been changed.

According to an exemplary embodiment of the present invention, a mobile terminal that supports both an AP and a BP guarantees a fast booting time by performing hibernation booting for the AP and the BP to control data to be synchronized depending on data change, and reducing a time delay caused by a booting process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A hibernation booting method in a mobile terminal that supports two processors, the method comprising:
    when power is turned on, performing, by a master processor, hibernation booting;
    performing, by a slave processor, normal booting or hibernation booting under control of the master processor; and
    determining, by the master processor and the slave processor, data needing synchronizing, and performing synchronization depending on whether the data needing synchronizing have been changed,
    wherein the determining of whether the data needing synchronizing have been changed comprises comparing information of a Subscriber Identification Module (SIM) card before and after the booting.

2. The method of claim 1, wherein the master processor and the slave processor use independent memories, respectively, or use a shared memory.

3. The method of claim 1, wherein if it is determined that the data have not been changed, the data needing synchronizing are determined such that the data comprise at least one of Real Time Clock (RTC), Public Land Mobile Network (PLMN), Service Principal Name (SPN), a battery level, a Received Signal Strength Indicator (RSSI) level, a network state, and a system IDentifier (ID).

4. The method of claim 1, wherein if it is determined that the data have been changed, the data needing synchronizing are determined such that the data comprise at least one of Real Time Clock (RTC), Public Land Mobile Network (PLMN), Service Principal Name (SPN), a battery level, a Received Signal Strength Indicator (RSSI) level, a network state, a system IDentifier (ID), and the changed data.

5. The method of claim 1, wherein the information of the SIM card before the booting is included in a snapshot image for hibernation of the master processor.

6. The method of claim 1, wherein the performing of, by the slave processor, the hibernation booting under control of the master processor comprises loading, by the master processor, a snapshot image of the slave processor from a non-volatile memory to provide the loaded snapshot image to the slave processor.

7. The method of claim 1, wherein the performing, by the slave processor, of the hibernation booting comprises:
when the two processors use independent memories, respectively, providing, by the master processor, a snapshot image of the slave processor via a link between the two processors; and
stacking, by the slave processor, the snapshot image of the slave processor in the memory of the slave processor.

8. The method of claim 1, wherein the performing, by the slave processor, of the hibernation booting comprises:
when the two processors use a shared memory, recording, by the master processor, a snapshot image of the slave processor in a shared region of the shared memory; and
stacking, by the slave processor, the snapshot image of the slave processor in a region of the shared memory that is used by the slave processor.

9. The method of claim 1, further comprising:
when the data have not been changed, not performing the synchronization; and
when the data have been changed, performing the synchronization on the changed data.

10. The method of claim 1, wherein the master processor and the slave processor communicate, at least in part, via a dual port random access memory (DPRAM).

11. A hibernation booting apparatus in a mobile terminal that supports two processors, the apparatus comprising:
a master processor for performing hibernation booting when power is turned on; and
a slave processor for performing normal booting or hibernation booting under control of the master processor,
wherein the master processor and the slave processor determine data needing synchronizing and perform synchronization depending on whether the data needing synchronizing have been changed, and
wherein the determining of whether the data needing synchronizing have been changed comprises comparing information of a Subscriber Identification Module (SIM) card before and after the booting.

12. The apparatus of claim 11, further comprising:
first and second memories corresponding to the master processor and the slave processor, respectively; or
a third memory shared by the master processor and the slave processor.

13. The apparatus of claim 11, wherein if it is determined that the data have not been changed, the master processor and the slave processor determine the data needing synchronizing such that the data comprise at least one of Real Time Clock (RTC), Public Land Mobile Network (PLMN), Service Principal Name (SPN), a battery level, a Received Signal Strength Indicator (RSSI) level, a network state, and a system IDentifier (ID).

14. The apparatus of claim 11, wherein if it is determined that the data have been changed, the master processor and the slave processor determine the data needing synchronizing such that the data comprise at least one of Real Time Clock (RTC), Public Land Mobile Network (PLMN), Service Principal Name (SPN), a battery level, a Received Signal Strength Indicator (RSSI) level, a network state, a system IDentifier (ID), and the changed data.

15. The apparatus of claim 11, further comprising a non-volatile memory for storing a snapshot image for hibernation of the master processor,
wherein the snapshot image comprises information of a SIM card before the booting.

16. The apparatus of claim 11, further comprising a non-volatile memory for storing snapshot images of the master processor and the slave processor,
wherein the master processor loads the snapshot image of the slave processor from the non-volatile memory to provide the loaded snapshot image to the slave processor.

17. The apparatus of claim 11, wherein when the two processors use independent memories, respectively, the master processor provides a snapshot image of the slave processor via a link between the two processors, and
the slave processor stacks the snapshot image of the slave processor provided via the link in the memory of the slave processor.

18. The apparatus of claim 11, wherein when the two processors use a shared memory, the master processor records a snapshot image of the slave processor in a shared region of the shared memory, and
the slave processor stacks the snapshot image of the slave processor in a region of the shared memory, which is used by the slave processor.

19. The apparatus of claim 11, wherein the master processor and the slave processor do not perform synchronization when the data have not been changed, and perform the synchronization on the changed data when the data have been changed.

20. The apparatus of claim 11, wherein the master processor and the slave processor communicate, at least in part, via a dual port random access memory (DPRAM).

* * * * *